United States Patent
Maeda

(10) Patent No.: US 10,355,575 B2
(45) Date of Patent: Jul. 16, 2019

(54) LINEAR MOTOR WITH REDUCED COGGING FORCE

(71) Applicant: FANUC CORPORATION, Yamanashi (JP)

(72) Inventor: Takuya Maeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/925,023

(22) Filed: Oct. 28, 2015

(65) Prior Publication Data

US 2016/0126820 A1    May 5, 2016

(30) Foreign Application Priority Data

Oct. 29, 2014   (JP) ................................ 2014-220344

(51) Int. Cl.
    *H02K 1/08*       (2006.01)
    *H02K 41/03*     (2006.01)
    *H02K 29/03*     (2006.01)

(52) U.S. Cl.
    CPC ........... *H02K 41/031* (2013.01); *H02K 29/03* (2013.01)

(58) Field of Classification Search
    CPC ............................... H02K 41/31; H02K 29/03
    USPC .............. 310/12.01, 12.24, 12.25, 12.26, 51
    See application file for complete search history.

(56) References Cited

U.S. PATENT DOCUMENTS

| | | | | |
|---|---|---|---|---|
| 4,912,746 A * | 3/1990 | Oishi | .................... | H02K 41/031 310/12.01 |
| 5,519,266 A * | 5/1996 | Chitayat | .................. | H02K 1/16 310/12.01 |
| 5,838,079 A * | 11/1998 | Morohashi | ............. | H02K 41/03 310/12.24 |
| 8,274,182 B2 * | 9/2012 | Nakayama | ............. | H02K 41/03 310/12.24 |
| 2004/0217659 A1 * | 11/2004 | Godkin | .................... | H02K 1/18 310/12.25 |
| 2005/0046281 A1 | 3/2005 | Sugita et al. | | |
| 2006/0006743 A1 * | 1/2006 | Kawai | .................. | H02K 41/031 310/12.22 |

(Continued)

FOREIGN PATENT DOCUMENTS

| CN | 1592051 A | 3/2005 |
|---|---|---|
| CN | 1719702 A | 1/2006 |

(Continued)

OTHER PUBLICATIONS

Untranslated Notification of Reasons for Refusal mailed by JPO, dated Mar. 15, 2016, 5 pages.

(Continued)

*Primary Examiner* — Bernard Rojas
*Assistant Examiner* — Ahmed Elnakib
(74) *Attorney, Agent, or Firm* — Fredrikson & Byron, P.A.

(57) ABSTRACT

A linear motor includes a plurality of magnets arranged at equal intervals, and an armature arranged opposite to the magnets and including an armature core having a plurality of teeth extending toward the magnets. The teeth include a first tooth located at one end in the thrust direction and a second tooth located at the other end on the opposite side. The first tooth and the second tooth have different dimensions or shapes so as to reduce cogging force generated due to the structure of the armature core at the ends in the thrust direction.

8 Claims, 8 Drawing Sheets

(56) References Cited

U.S. PATENT DOCUMENTS

| | | | |
|---|---|---|---|
| 2008/0111439 A1 | 5/2008 | Huang et al. | |
| 2008/0136268 A1* | 6/2008 | Lachat | H02K 41/031 310/12.23 |
| 2009/0189465 A1* | 7/2009 | Matscheko | H02K 41/03 310/12.18 |
| 2011/0221284 A1* | 9/2011 | Kakihara | H02K 41/031 310/12.26 |

FOREIGN PATENT DOCUMENTS

| | | | |
|---|---|---|---|
| CN | 101816118 A | | 8/2010 |
| CN | 102957296 A | | 3/2013 |
| CN | 205160336 U | | 4/2016 |
| JP | H06038500 A | | 2/1994 |
| JP | 2001128437 A | | 5/2001 |
| JP | 2003299342 A | | 10/2003 |
| JP | 2004364374 A | | 12/2004 |
| JP | 2005102487 A | | 4/2005 |
| JP | 2005223997 A | | 8/2005 |
| JP | 2008125322 | * | 5/2008 |
| JP | 2008125322 A | | 5/2008 |
| JP | 2011188709 A | | 9/2011 |
| JP | 2013046464 A | | 3/2013 |
| WO | 2009044748 A1 | | 4/2009 |

OTHER PUBLICATIONS

English machine translation of Notification of Reasons for Refusal mailed by JPO, dated Mar. 15, 2016, 4 pages.
Untranslated Decision to Grant a Patent mailed by JPO, dated Jul. 26, 2016, 3 pages.
English machine translation of Decision to Grant a Patent mailed by JPO, dated Jul. 26, 2016, 3 pages.
English Abstract for Japanese Publication No. 2003-299342 A, published Oct. 17, 2003, 1 pg.
English Abstract for Japanese Publication No. 2005-233997 A, published Aug. 18, 2005, 1 pg.
English Abstract for Japanese Publication No. 2005-102487 A, published Apr. 14, 2005, 1 pg.
English Abstract for Japanese Publication No. 2008-125322 A, published May 29, 2008, 1 pg.
English Abstract for Japanese Publication No. 2004-364374 A, published Dec. 24, 2004, 1 pg.
English Abstract for Japanese Publication No. 2011-188709 A, published Sep. 22, 2011, 1 pg.
English Translation of Japanese Publication No. 2013046464, published Mar. 4, 2013, 11 pages.
English Translation of Japanese Publication No. 2001128437, published May 11, 2001, 8 pages.
English Translation of Japanese Publication No. H06038500, published Feb. 10, 1994, 10 pages.
English Abstract and Machine Translation for Chinese Publication No. 205160336 U, published Apr. 13, 2016, 9 pgs.
English Abstract and Machine Translation for Chinese Publication No. 102957296 A, published Mar. 6, 2013, 7 pgs.
English Abstract and Machine Translation for Chinese Publication No. 101816118 A, published Aug. 25, 2010, 16 pgs.
English Abstract for Chinese Publication No. 1719702 A, published Jan. 11, 2006, 3 pgs.
English Abstract for Chinese Publication No. 1592051 A, published Mar. 9, 2005, 4 pgs.

* cited by examiner

LINEAR MOTOR WITH REDUCED COGGING FORCE

BACKGROUND OF THE INVENTION

1. Field of the Invention

The present invention relates to a linear motor.

2. Description of the Related Art

Differing from rotary motors, in linear motors, the armature has a limited length in the thrust direction. As a result, it has been known that the thrust of the linear motor has a pulsating component, called cogging force, due to the structure at the opposite ends of the armature with respect to the thrust direction. The cogging force may cause reduction in the positioning precision of the linear motor. Accordingly, various measures have been proposed to reduce the cogging force, including modifying the shapes of the teeth at both ends or the like.

JP2003-299342A discloses a linear motor in which the tip of the tooth located at either end in the armature moving direction is partly cut off on the side on which no neighboring tooth is formed, so that the length of the tip of the tooth with respect to the armature moving direction is shorter than that of the other teeth.

JP2005-223997A discloses a linear motor in which the surfaces of the two pole teeth located at both ends of the core includes: a first slope inclined so that the gap between the pole tooth surface and the permanent magnet array becomes gradually greater as it is farther away from the neighboring tooth; and a second slope inclined so that the gap between the pole tooth surface and the permanent magnet array becomes gradually smaller as it is farther away from the first slope.

JP2005-102487A discloses a linear motor in which the magnetic pole surfaces of the pole teeth located at both ends of the core have an arc-curved surface such that its gap with the permanent magnet array becomes greater as it is farther away from the neighboring tooth.

JP2008-125322A discloses a linear motor including an armature which has a plurality of main teeth arranged parallel to each other with a pair of auxiliary teeth at both ends of the main teeth, in which the auxiliary teeth are arranged obliquely to the main teeth.

JP2004-364374A discloses a linear motor including an armature which has a plurality of main teeth arranged parallel to each other with a pair of auxiliary teeth at both ends of the main teeth, in which the shapes of the auxiliary teeth are changed in accordance with the length of the armature core in the aligning direction of field poles or the number of the main teeth.

JP2011-188709A discloses a linear motor including an armature which has a plurality of main teeth wound with windings as well as a pair of auxiliary teeth at opposite ends of the armature core, in which the auxiliary teeth are formed so that the dimensions perpendicular to the moving direction are changed along the direction of travel.

WO2009/044748A discloses a linear motor including a stator and a rotor, in which the tip of each tooth of the rotor has a portion projecting in the moving direction of the rotor and is divided into multiple areas in a direction perpendicular to the moving direction of the rotor and parallel to the magnetic pole surface of the permanent magnets of the stator, and the amount of projection in the moving direction is modified at least in one of the neighboring areas.

According to the above known art, there are many factors to be considered in determining the size of the teeth located at the ends of the armature core, so that it is difficult to obtain an optimal solution to reduce the cogging force. Further, the known art can provide only limited effects in reducing the cogging force. Therefore, there is a need for a linear motor that can effectively reduce the cogging force due to the structure at the ends of the armature.

SUMMARY OF THE INVENTION

In accordance with a first aspect of the present invention, provided is provided a linear motor comprising: a plurality of magnets arranged at equal intervals; and an armature arranged opposite to the magnets, the armature comprising an armature core having a plurality of teeth extending toward the magnets, the linear motor being configured to generate thrust in a thrust direction along a plane facing the magnets and the armature, wherein the teeth include a first tooth located at one end in the thrust direction and a second tooth located at the other end opposite the first tooth, the first tooth and the second tooth having different dimensions or different shapes from each other, so as to reduce cogging force generated due to a structure of the armature core at ends in the thrust direction.

In accordance with a second aspect of the present invention, in the linear motor according to the first aspect, the first tooth and the second tooth have different dimensions or different shapes from each other, when viewed from the magnets opposite to the first tooth and the second tooth, respectively.

In accordance with a third aspect of the present invention, in the linear motor according to the second aspect, each of the first tooth and the second tooth has a rectangular shape, when viewed from the magnets opposite to the first tooth and the second tooth, respectively, and widths of the first tooth and of the second tooth defined in the thrust direction are different from each other.

In accordance with a fourth aspect of the present invention, in the linear motor according to the first aspect, each of the first tooth and the second tooth has a stepped portion.

In accordance with a fifth aspect of the present invention, in the linear motor according to the fourth aspect, the armature core is formed of a plurality of armature core elements having the same shape in cross section as each other, and one of the armature core elements is oriented in the opposite direction from the other armature core elements, so that the first tooth and the second tooth has the stepped portion.

In accordance with a sixth aspect of the present invention, in the linear motor according to the fourth aspect, the armature core is formed of a plurality of armature core elements, and at least one of the armature core elements is oriented in the opposite direction from the other armature core element, so that the number of the stepped portions formed on the first tooth and the second tooth is 2m (m: natural number).

In accordance with a seventh aspect of the present invention, in the linear motor according to any one of the first to third aspects, the first tooth and the second tooth extend obliquely relative to a direction perpendicular to the thrust direction.

In accordance with an eighth aspect of the present invention, in the linear motor according to any one of the first to seventh aspects, no winding is wound around the first tooth and the second tooth, the first tooth and the second tooth is in contact with windings wound around teeth adjacent to the first tooth and the second tooth, respectively, with an insulator interposed therebetween, and teeth, except for the first tooth and the second tooth, are in contact with windings on both sides thereof with an insulator interposed therebetween.

These and other objects, features and advantages of the present invention will become more apparent in light of the detailed description of exemplary embodiments thereof as illustrated in the drawings.

DETAILED DESCRIPTION

Figure 1:
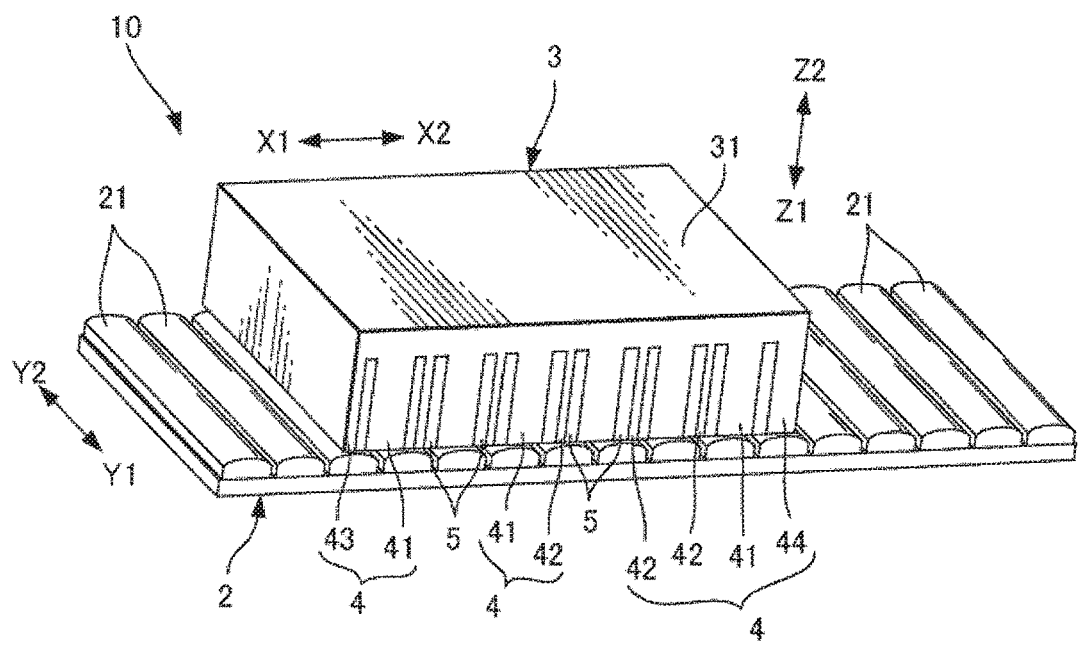
FIG. 1 is a perspective view showing a linear motor according to one embodiment.

Referring to the accompanying drawings, embodiments of the present invention will be described. The constituent elements shown in the drawings are depicted in different scales as necessary for better understanding of the present invention. Further, the same or corresponding constituents are allotted with the same reference numerals.

FIG. 1 is a perspective view showing a linear motor according to one embodiment. A linear motor 10 includes a magnet board 2 extending in the moving directions of the linear motor 10, indicated by arrows X1 and X2, and an armature 3 provided opposite to the magnet board 2. On a surface of the magnet board 2 facing the armature 3, elongated magnets 21 extending in directions (the directions indicated by arrows Y1 and Y2) perpendicular to the moving direction of the linear motor 10 are arranged at equal intervals. The magnets 21 are fixed to the magnet board 2 by known means such as screw fitting, adhesives, additional locking parts, or the like.

The magnet 21 is a permanent magnet such as a neodymium magnet or the like, forming field magnet poles of the linear motor 10. The surface of the magnet 21 facing the armature 3 is curved in a quadratic curve, arc, or hyperbolic cosine, for example. Each magnet 21 has the same cross-section along its longitudinal directions (the directions indicated by arrows Y1 and Y2). The magnets 21 are arrayed so that the magnetic poles of any neighboring magnets 21 are oriented in opposite directions.

The armature 3 includes an armature core 31 which has a plate-like main body extending parallel to the magnet board 2 and a plurality of teeth 4 projecting from the main body toward the magnets 21 on the magnet board 2 in the direction of arrow Z1. The armature core 31 is formed of electromagnetic steel sheets laminated in the directions indicated by arrows Y1 and Y2.

Teeth 4 include main teeth 41 with windings 5 wound therearound and auxiliary teeth 42 with no winding 5. Main teeth 41 and auxiliary teeth 42 are arranged alternately at certain intervals in the directions indicated by arrows X1 and X2. Each winding 5 is arranged in contact with the main tooth 41 and the auxiliary teeth 42 via unillustrated insulating paper. A three-phase alternating current is supplied to the windings 5 so as to generate magnetic fields moving in the directions indicated by arrows X1 and X2.

Figure 2:
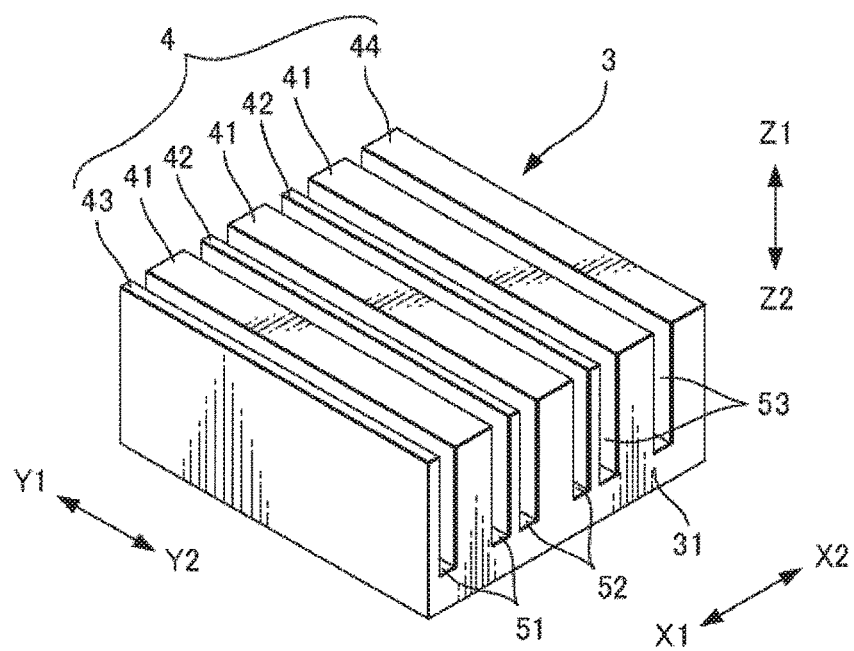
FIG. 2 is a diagram showing an exemplary configuration of an armature of a linear motor according to one embodiment.

FIG. 2 is a diagram showing the armature 3 according to one embodiment, viewed from the side of the magnets 21 (in the direction indicated by arrow Z1 in FIG. 1). The armature 3 shown in FIG. 2 has a basic configuration including three windings, to which a three-phase alternating current including U-phase, V-phase and W-phase is supplied. For simplicity, no windings are shown in FIG. 2. The armature core 31 has three slots 51, 52 and 53 formed between the main teeth 41, the auxiliary teeth 42, a first tooth 43 and a second tooth 44, which will be described further below. As illustrated, each tooth 4 has a rectangular shape when viewed from the tip of the tooth 4 and a rectangular parallelepiped shape extending in the direction indicated by arrow Z1, with a constant width in the directions indicated by arrows Y1 and Y2.

The linear motor 10 is adapted to move by thrust generated in the direction along the surfaces of the armature 3 and magnets 21 opposed to each other due to the interaction between the magnets 21 and the moving magnetic field generated by the 3-phase alternating current supplied to the windings 5 wound around the main teeth 41. Only one of the magnet board 2 or the armature 3 may move, or alternatively, both of them may move relative to each other.

It has been known that in the linear motor 10, a phenomenon of pulsation in the thrust is caused due to the structure of the ends of the armature 3, or in other words, "cogging" is generated. In the present specification, the periodical pulsation in force component will be referred to as "cogging force." Since the cogging force depends on the positional relationship between the ends of the armature 3 and the magnets 21 opposite thereto, it is generated every time the ends of the armature 3 pass by the magnets 21. Referring to FIG. 2, the armature 3 formed only with three slots 51, 52 and 53 has the minimum configuration when the windings are energized by a 3-phase alternating current. Since the armature 3 of this configuration is short in length with respect to the direction of the thrust, the influence of the cogging force caused due to the end structure becomes relatively great.

In the present embodiment, in order to reduce the cogging force generated due to the end structure, an auxiliary tooth (hereinafter may also be referred to as "the first tooth" for convenience) 43 of the armature 3 situated at the end in the direction indicated by arrow X1 has different dimensions from those of an auxiliary tooth (hereinafter may also be referred to as "the second tooth" for convenience) 44 of the armature 3 situated at the end in the direction indicated by arrow X2.

Figure 3:
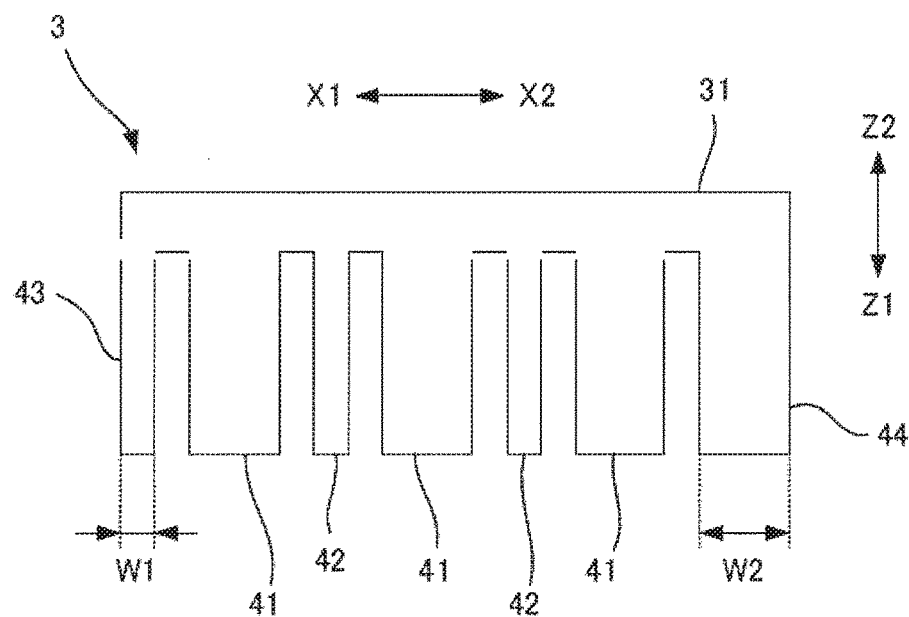
FIG. 3 is a front view showing the armature of FIG. 2.

FIG. 3 is a front view showing the armature 3 shown in FIG. 2. Similarly to FIG. 2, windings 5 are not illustrated in FIG. 3. According to the present embodiment, the first tooth 43 and the second tooth 44 are sized so that the dimension of the first tooth 43 in the direction indicated by arrows X1 and X2, or the width W1, is smaller than the width W2 of the second tooth 44. By the virtue of the configuration in which the width W1 of the first tooth 43 and the width W2 of the second tooth 44 are different from each other, the cogging force generated due to the end structure of the armature 3 can be reduced.

Figure 4:
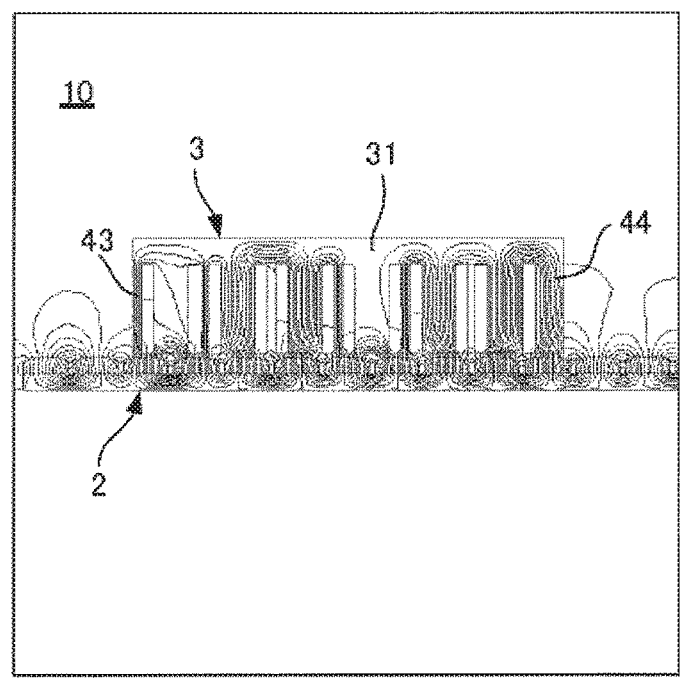
FIG. 4 is a diagram showing magnetic field lines generated in a linear motor according to one embodiment.

FIG. 4 is a diagram showing magnetic field lines generated in the linear motor 10 in which the width W1 of the first tooth 43 is sized to be smaller than the width W2 of the second tooth 44 as described with reference to FIGS. 2 and 3. Lines extending from the magnets 21 represent magnetic field lines. A small spacing between adjacent magnetic field lines indicates a stronger magnetic field. As shown in FIG. 4, the spacing of magnetic field lines extending through the first tooth 43 is generally the same as the second tooth 44. Accordingly, the strengths of the magnetic fields generated at opposite ends of the armature 3 are generally equivalent to each other, and it can be estimated that the magnetic field lines are substantially equally distributed as a whole. It is evident for those skilled in the art that the force acting on the linear motor 10 can be determined based on the magnetic field diagram of this kind.

Figure 10:
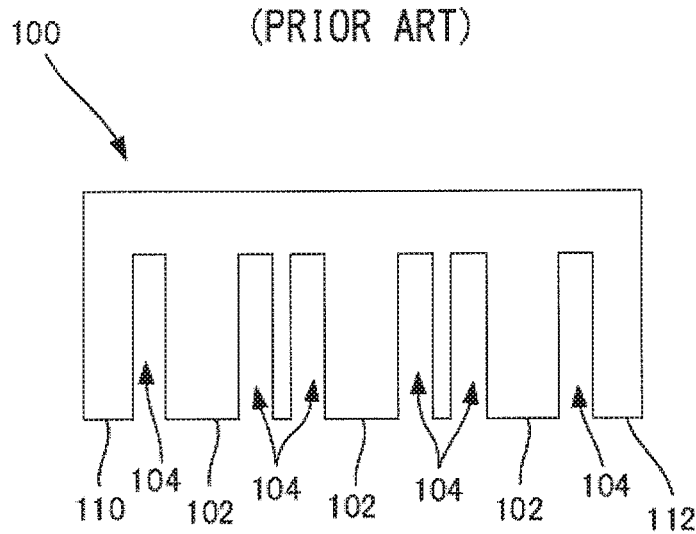
FIG. 10 is a front view showing an armature of a linear motor according to the related art.

FIG. 10 shows a configuration of an armature 100 of a linear motor according to a comparative example. The armature 100 is formed with slots 104 around three main teeth 102, similarly to the armature 3 shown in FIG. 3. However, the armature 100 is different from the armature 3 of the present embodiment in that the first tooth 110 and the second tooth 112 located at opposite ends of the armature core have the same shape and the same dimensions.

Figure 11:
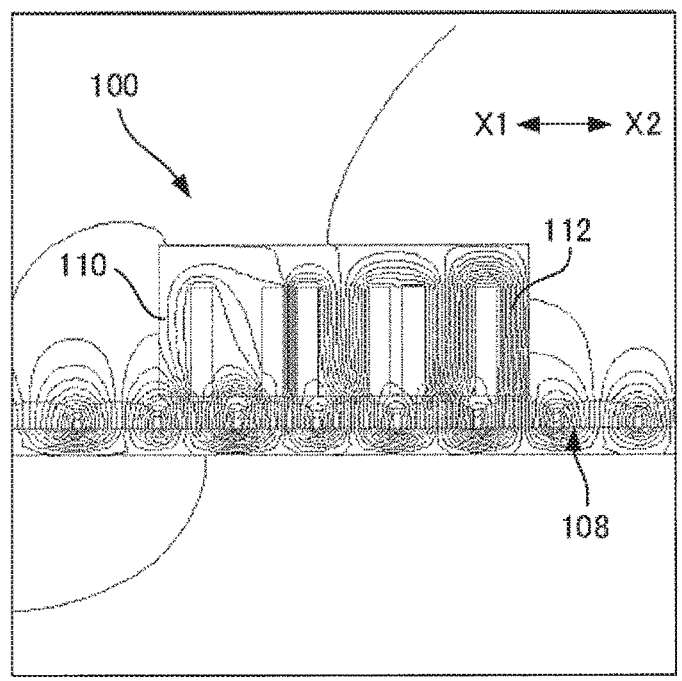
FIG. 11 is a diagram showing magnetic field lines generated in the linear motor according to the related art shown in FIG. 10.

FIG. 11 is a diagram showing magnetic field lines generated in the linear motor with the armature 100 shown in FIG. 10. In this case, the spacing of magnetic field lines passing through the first tooth 110 is greater than that of the magnetic field lines passing through the second tooth 112. This means that the strength of the magnetic field passing through the first tooth 110 is substantially smaller than the strength of the magnetic field passing through the second tooth 112. Further, it appears that the spacing between the magnetic field lines are not uniform in the gap portion between the armature 100 and the magnet array 108. It should be understood that the magnetic field lines as a whole can be unevenly distributed in and around the armature 100. The imbalance of the magnetic field between the ends of the armature 100 results in the increased cogging force.

The magnetic field diagram shown in FIG. 4 varies depending on the positional relationship between the armature 3 and the magnet board 2. According to the present embodiment, the positional relationship between the armature 3 and the magnet board 2 is changed while the tooth widths of the first and second teeth 43 and 44 viewed from the tip are adjusted, and then the distribution of the magnetic field lines in each of the positional relationships is analyzed. Based on the analysis, suitable tooth widths with which the strength of the magnetic field becomes uniform in any of the positional relationships are determined. In the case of the existing armature having a symmetrical end structure, the strength of the magnetic field cannot be sufficiently uniform. In contrast, it has been found that the strength of the magnetic field can be uniform when the first and second teeth 43 and 44 located at the opposite ends of the armature 3 are different in shape and dimensions.

Figure 12:
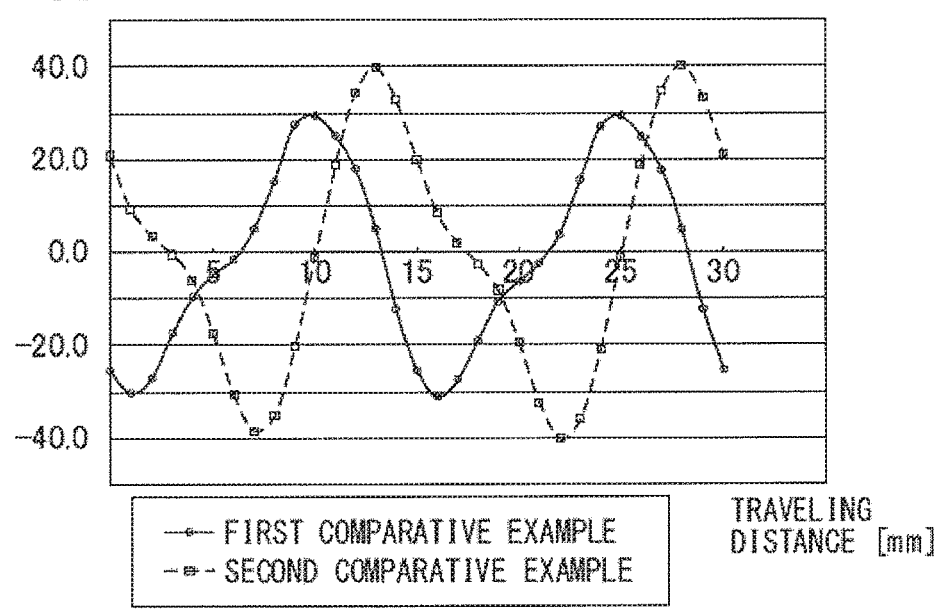
FIG. 12 is a diagram showing the cogging force generated in the linear motor according to the related art.
Figure 13:
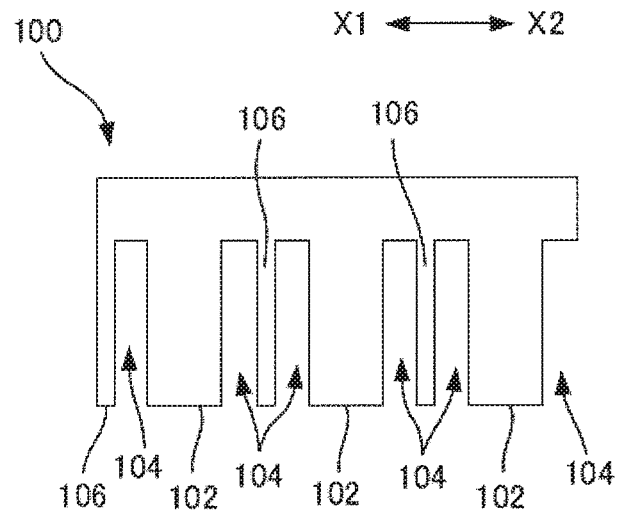
FIG. 13 is a front view of an armature of a linear motor according to the related art; and, FIG. 14 is a front view of an armature of a linear motor according to the related art.

FIG. 12 is a graph showing the cogging force generated in linear motors according to comparative examples. The solid line in FIG. 12 shows the cogging force generated in the first comparative example, whereas the dashed line shows the cogging force generated in the second comparative example. According to the first comparative example as shown in FIG. 13, the armature 100 has an auxiliary tooth 106 at one end in the direction indicated by arrow X1, but does not have an auxiliary tooth 106 at the other end in the direction indicated by arrow X2. Accordingly, one of the windings inserted in the slots 104 around the main teeth 102 is located at the end of the armature 100 in the direction indicated by arrow X2.

Figure 14:
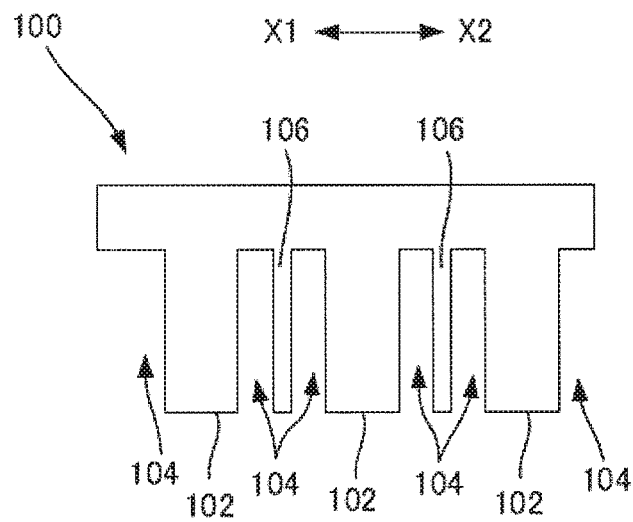

On the other hand, the armature 100 according to the second comparative example as shown in FIG. 14 has no auxiliary teeth 106 at both ends. Accordingly, the windings which, although not illustrated, are inserted in the slots 104 are located at both ends of the armature 100, respectively.

Returning to FIG. 12, in the first comparative example, a cogging force having amplitude of about 30 N is generated every 15 mm of the traveling distance, which corresponds to the pitch of the array of magnets. In other words, the cogging force is generated every time the armature passes by a magnet. In the second comparative example, a cogging force having amplitude of about 40 N is generated every 15 mm of the traveling distance. In the first and second comparative examples, the length of the magnet in the longitudinal direction and the entire width of the armature (corresponding to the dimension in the directions indicated by arrows Y1 and Y2) are 50 mm, respectively.

Figure 5:
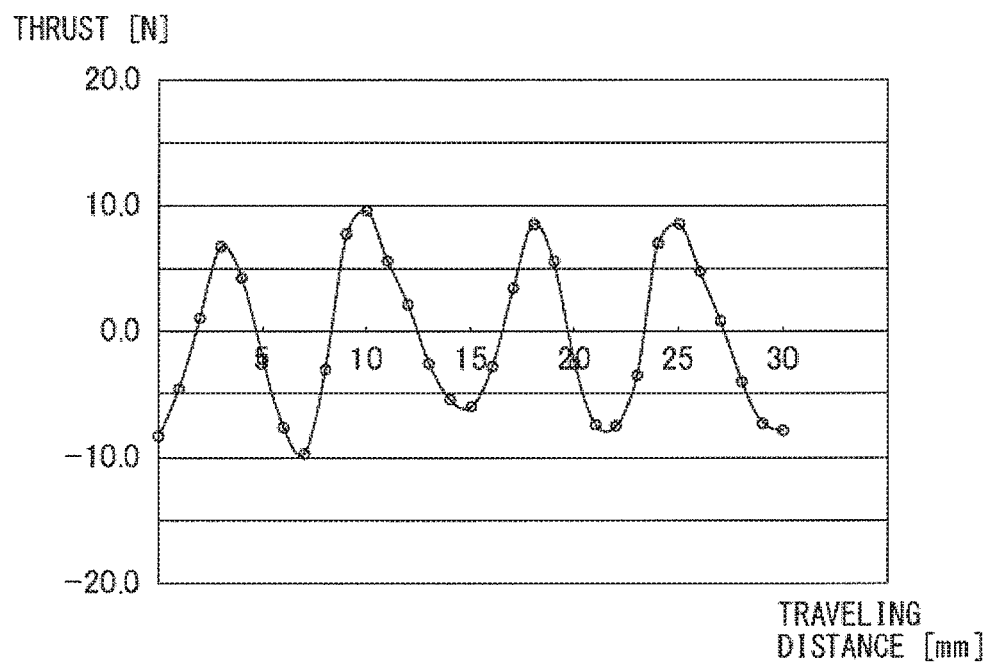
FIG. 5 is a diagram showing the cogging force generated in a linear motor according to one embodiment.

FIG. 5 is a graph showing the cogging force generated in the linear motor including the armature 3 described above with reference to FIGS. 2 and 3. The pitch of the magnets 21 is 15 mm, similarly to the aforementioned comparative examples. Also, the length of the magnet 21 and the entire width of the armature 3 in the directions indicated by arrows Y1 and Y2 are 50 mm, respectively. However, in the linear motor of the present embodiment, by virtue of the interaction between the first and second teeth 43 and 44 widths of different dimensions and the magnets 21 opposite thereto, two components of cogging force are generated at different phase and shifted by 15 mm of the traveling distance. These two components of cogging force cancel each other out, and as a result, the amplitude of the cogging force can be decreased to less than 10N, as shown in FIG. 5.

According to the present invention, in order to reduce the imbalance of the magnetic field lines as shown in FIG. 11, the teeth at the opposite ends of the armature 3, or the first tooth 43 and the second tooth 44, are modified in dimensions or shape. The dimensions and shapes of the first tooth 43 and the second tooth 44 are adjusted in consideration of the properties of magnetic field lines, in which force acts in a direction to minimize the lengths of the magnetic field lines and the magnetic field lines repel each other. It is effective to make adjustments on the dimensions or shape of the first and second teeth 43 and 44 in portions that are viewed from the corresponding magnets 21 facing the first tooth 43 and the second tooth 44, respectively. However, it may also be possible that the first tooth 43 and the second tooth 44 are different in dimensions and shape in portions, other than those viewed from the corresponding magnet 21.

The analysis of magnetic field lines generated in the linear motors shown in FIGS. 4 and 11 can be performed using the finite element method. As exemplified in the present embodiment, the widths of the first and second tooth in the thrust direction are adjusted to determine the suitable dimensions by which the imbalance of the magnetic field lines can be reduced. The reduction of cogging force by the modification to the tooth widths can also apply to any type of teeth, other than that having a rectangular parallelepiped shape. Also, when only one of the first and second teeth is modified in shape, the suitable shape to reduce cogging force can be determined through the analysis on the magnetic field lines while the shape of the tooth is changed, together with fine adjustments to the dimensions as necessary. In this way, according to the present invention, based on the result of the two-dimensional or three-dimensional analysis on the magnetic action in the linear motor, it is possible to reduce cogging force.

As described above with reference to FIGS. 1 to 5, in the linear motor 10 according to the present embodiment, the cogging force generated due to the end structure of the armature 3 can be reduced by virtue of the first tooth 43 and second tooth 44 at the opposite ends of the armature 3 having different dimensions. Further, according to the illustrated embodiment, it is advantageous that cogging force can be reduced by way of relatively simple method, namely by adjusting the width W1 of the first tooth 43 and the width W2 of the second tooth 44. In the case where the main teeth 41, the auxiliary teeth 42, the first tooth 43 and the second tooth 44 have a rectangular parallelepiped shape, respectively, coiled windings 5 can be easily inserted into the slots 51, 52 and 53, thereby improving work efficiency. Furthermore, in the case where the windings 5 are in contact with all of the teeth 4 including the first and second teeth 43 and 44 with insulating paper interposed therebetween, heat generated from the windings 5 can be uniformly dissipated, thereby preventing heat from building up at particular sites in the armature.

Figure 6A:
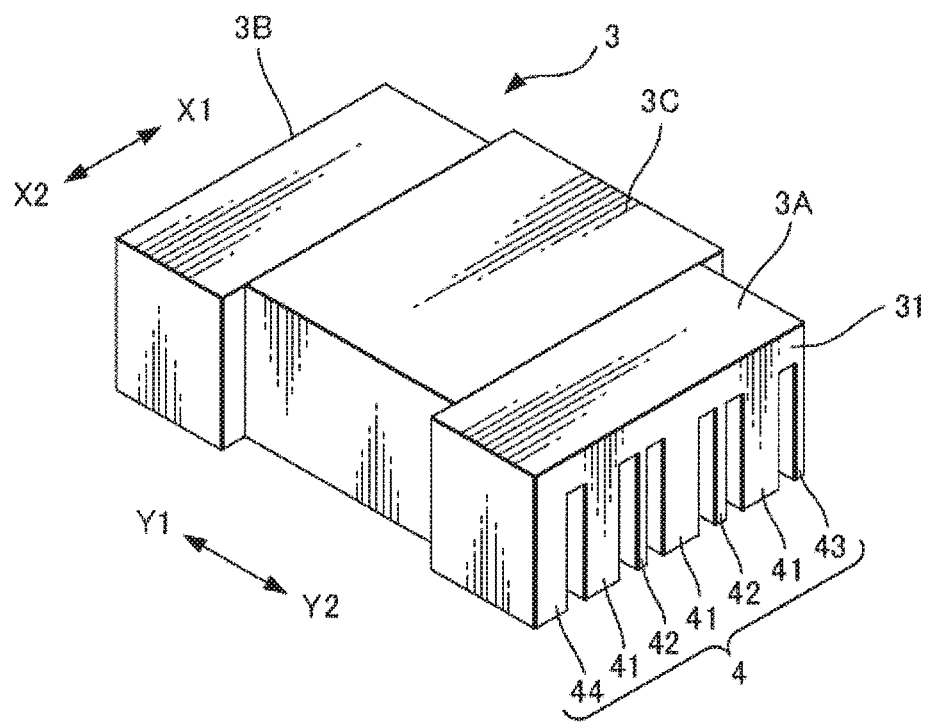
FIG. 6A is a diagram showing an exemplary configuration of an armature in a linear motor according to another embodiment.
Figure 6B:
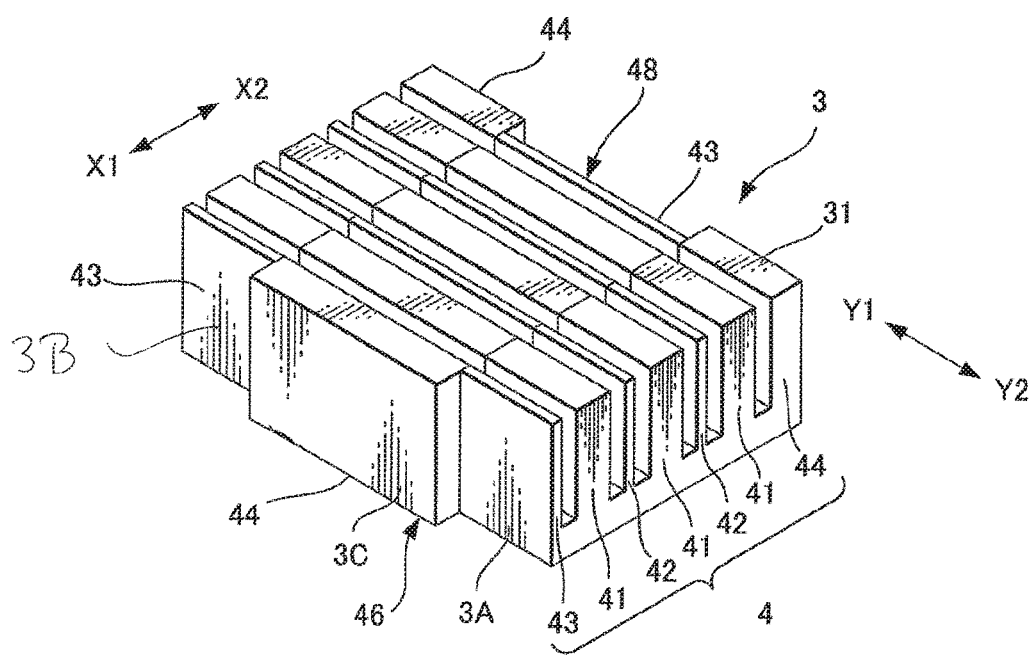
FIG. 6B is a diagram of the armature of FIG. 6A, viewed from the opposite side.

FIGS. 6A and 6B are diagrams showing an armature 3 according to another embodiment. FIG. 6A is a perspective view of the armature 3, viewed from the side opposite the teeth 4. FIG. 6B is a perspective view of the armature 3, viewed from the tip of the teeth 4. In the present embodiment, an armature core 31 is formed of a first armature core element 3A, a second armature core element 3B and a third armature core element 3C. The first, second and third armature core elements 3A, 3B and 3C are formed by laminating electromagnetic steel sheets of the same shape and size, respectively. The first, second and third armature core elements 3A, 3B and 3C are arranged side by side abreast in the directions indicated by arrows Y1 and Y2, which are perpendicular to the thrust direction. The third armature core element 3C is arranged between the first armature core element 3A and the second armature core element 3B.

The first and second armature core elements 3A and 3B have the same shape and dimensions as each other. The third armature core element 3C has a width in the directions indicated by arrows Y1 and Y2, which is equal to the sum of the width of the first armature core element 3A and the width of the second armature core element 3B. In other words, the third armature core element 3C has twice the width of the first armature core 3A or the second armature core element 3B. Each of the armature core elements 3A, 3B and 3C has the first tooth 43 and the second tooth 44 having different dimensions from each other, at opposite ends with respect to the directions indicated by arrows X1 and X2, similarly to the embodiment described above with reference to FIGS. 2 and 3. Specifically, the width of the first tooth 43 is sized so as to be smaller than the width of the second tooth 44.

The third armature core element 3C is at 180 degrees relative to the first and second armature core elements 3A and 3B and oriented in the opposite direction. Further, the three armature core elements 3A, 3B and 3C are positioned so that their main teeth 41 and the auxiliary teeth 42 are aligned along the directions indicated by arrows Y1 and Y2. Therefore, the slots for the windings around the main teeth 41 are also aligned along the directions indicated by arrows Y1 and Y2.

At one end of the armature 3 in the direction indicated by arrow X1, there are steps between the first teeth 43 of the first armature core element 3A and the second armature core element 3B, and the second tooth 44 of the third armature core element 3C, thus forming a projecting portion 46. At the other side of the armature 3 in the direction indicated by arrow X2, there are steps between the second teeth 44 of the first armature core element 3A and the second armature core element 3B, and the first tooth 43 of the third armature core element 3C, thus forming a depressed portion 48. The projecting portion 46 and the depressed portion 48 extend over a half of the entire width of the armature 3 in the directions indicated by arrows Y1 and Y2.

Figure 7:
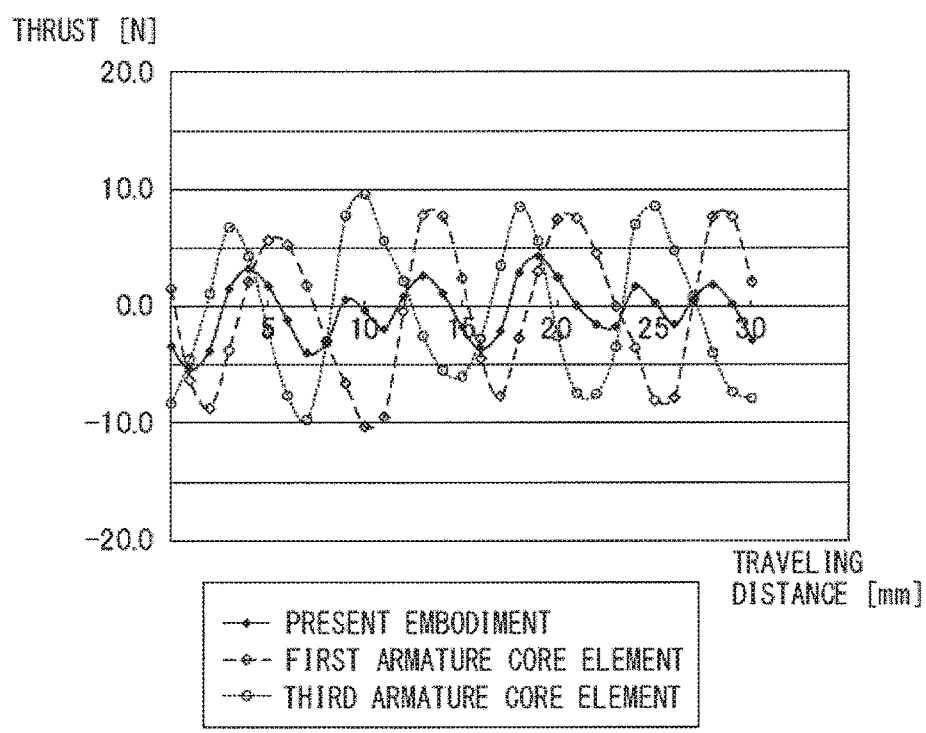
FIG. 7 is a diagram showing the cogging force generated in a linear motor according to one embodiment.

FIG. 7 is a graph showing cogging force generated in the linear motors including the armature formed in accordance with the present embodiment, first and second examples. The solid line in FIG. 7 shows the cogging force generated in the linear motor including the armature 3 of the present embodiment described above with reference to FIGS. 6A and 6B. The dashed line in FIG. 7 shows a first example in which the armature core is formed of the first armature core element 3A only so that no steps are formed at the ends of the armature core. The dotted line in FIG. 7 shows a second example in which the armature core is formed of the third armature core element 3C only so that no steps are formed at the ends of the armature core. As described above, the first armature core element 3A and the third armature core element 3C are formed by laminating the same electromagnetic steel sheets, but arranged at 180 degrees relative to each other.

The first example has the same result as that shown in FIG. 5, i.e., cogging force with amplitude of about 10 N is generated two times every 15 mm of the traveling distance, which corresponds to the pitch of the magnets 21. Since the second example is only different from the first example in that the armature is rotated 180 degrees, cogging force of amplitude of about 10 N is generated two times every 15 mm of the traveling distance in the same manner.

In contrast, according to the present embodiment, cogging force of amplitude of about 5N is generated four times every 15 mm of the traveling distance. The tooth at the end of the armature 3 of the present embodiment is formed with a stepped portion, i.e., the projecting portion 46 or the depressed portion 48. Due to this, two components of cogging force at different phases are generated at either end of the armature 3, so that four components of cogging force cancel one another out. As a result, the cogging force generated every time the armature 3 passes by each magnet 21 can be reduced as shown in FIG. 7.

As in the illustrated embodiment, by using the armature core elements 3A, 3B and 3C formed of the identical electromagnetic steel sheets, the armature core 31 having teeth with a stepped portion at both ends can be produced using a common die. Accordingly, the production cost and maintenance cost of the armature 3, and therefore those of the linear motor 10 can be reduced. However, the present invention should not be limited to such a particular embodiment. An armature having teeth with a stepped portion at both ends may also be produced by laminating multiple types of electromagnetic steel sheets different from each other. Further, the armature may be formed of four or more armature core elements so that the teeth at the opposite ends of the armature core 31 have two or more stepped portions. For example, additional armature core elements each having different end structures (dimensions and shapes of the first and second teeth) may be used. In this case, at least one of the additional armature core elements is oriented in the opposite direction, thereby forming an armature core having the teeth at the ends provided with four, six, or more stepped portions.

Figure 8:
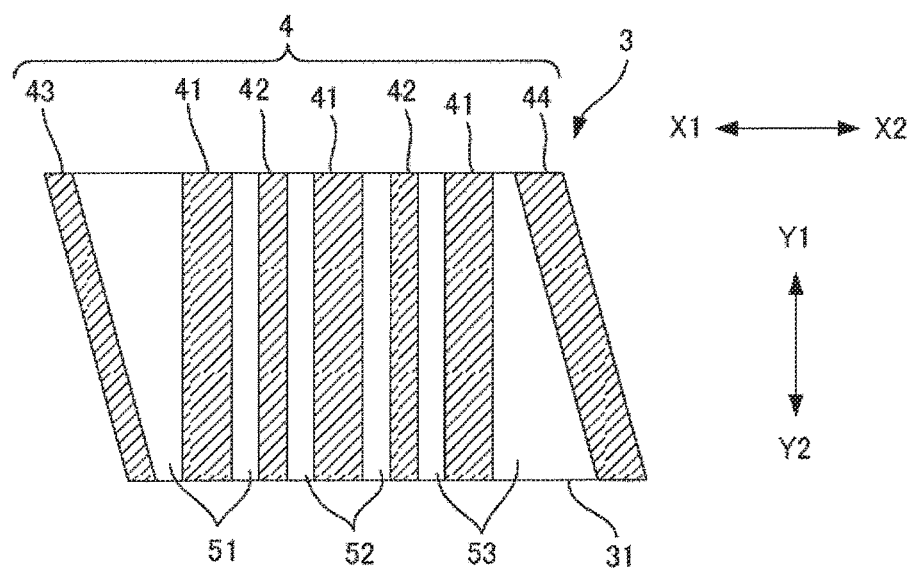
FIG. 8 is a diagram showing an exemplary configuration of an armature in a linear motor according to another embodiment.

FIG. 8 shows a configuration of an armature 3 of a linear motor according to yet another embodiment. FIG. 8 is a diagram of the armature 3, viewed from the tip of teeth 4 (from the direction indicated by arrow Z1 in FIG. 1). According to the present embodiment, among the teeth 4 extending from the armature core 31, the first and second teeth 43 and 44 located at the opposite ends in the moving directions of the linear motor are formed obliquely to the directions perpendicular to the moving directions, or the directions indicated by arrows Y1 and Y2. Other configurations are the same as those of the armature of the embodiment described above with reference to FIGS. 2 and 3. Also in the linear motor having such a skew structure, by virtue of the first tooth 43 and the second tooth 44 located at both ends of the armature 3 and having the different dimensions from each other, the cogging forces generated due to the end structure of the armature can cancel each other out, thereby achieving the effect of reducing the cogging force.

Figure 9:
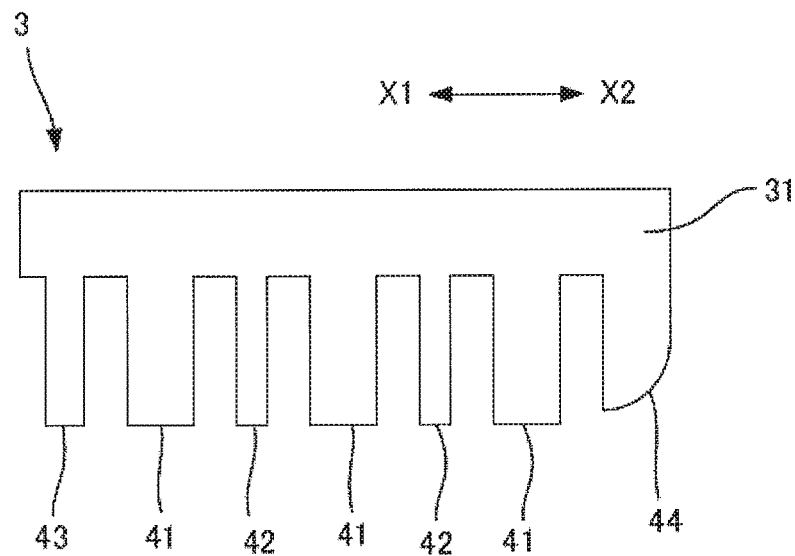
FIG. 9 is a diagram showing an exemplary configuration of an armature in a linear motor according to another embodiment.

FIG. 9 shows a configuration of an armature 3 of a linear motor according to still another embodiment. According to the present embodiment, the first tooth 43 and the second tooth 44 have different shapes. Specifically, the first tooth 43 has a rectangular parallelepiped shaped. The second tooth 44 has a flat surface on the side facing the adjacent main tooth 41 (the end face viewed from the direction indicated by arrow X1) and a curved surface with an arc-shaped contour at the farther end so that the tooth width becomes gradually smaller toward the tip. Also in the armature 3 having an asymmetric shape, the cogging forces generated due to the end structure of the armature 3 can be cancelled out similarly to the above-described other embodiments, thereby reducing the cogging force.

Effect of the Invention

According to the linear motor of the present invention, the dimensions and shapes of the teeth located at the opposite ends of the armature are different from each other, so as to reduce the cogging force generated due the structure of the armature at the ends in the thrust directions. This allows a linear motor to operate smoothly and improve precision in positioning.

Although various embodiments and variants of the present invention have been described above, it is apparent for a person skilled in the art that the intended functions and effects can also be realized by other embodiments and variants. In particular, it is possible to omit or replace a constituent element of the embodiments and variants, or additionally provide a known means, without departing from the scope of the present invention. Further, it is apparent for a person skilled in the art that the present invention can be implemented by any combination of features of the embodiments either explicitly or implicitly disclosed herein.

The invention claimed is:

1. A linear motor comprising:
a plurality of magnets arranged at equal intervals; and
an armature arranged opposite to the magnets, the armature comprising an armature core having a plurality of teeth extending toward the magnets, the linear motor being configured to generate thrust in a thrust direction along a plane facing the magnets and the armature,
wherein the teeth include a first tooth located at one end of the armature core in the thrust direction and a second tooth located at the other end opposite to the one end, the first tooth and the second tooth having different dimensions or different shapes from each other, so as to reduce cogging force generated due to a structure of the armature core at ends in the thrust direction,
wherein the armature core comprises a first armature core element and a second armature core element having the same shape in cross section as each other in the thrust direction,
wherein a width of the first tooth in the thrust direction of the first armature core element is different from a width of the second tooth in the thrust direction of the first armature core element,
wherein a width of the first tooth in the thrust direction of the second armature core element is different from a width of the second tooth in the thrust direction of the second armature core element,
wherein the teeth further include a third tooth and a fourth tooth respectively adjacent to the first tooth and the second tooth in the thrust direction, each width in the thrust direction of the third tooth and the fourth tooth being identical to that of the first tooth,
wherein the first armature core element and the second armature core element are juxtaposed on the same side relative to the plurality of magnets and in a transverse direction perpendicular to the thrust direction,
wherein the first armature core element is oriented in a direction opposite to the second armature core element with respect to the thrust direction, so that the first tooth has a projecting portion projecting toward the thrust direction and the second tooth has a depressed portion depressed toward the thrust direction,
wherein a width of the first tooth in the thrust direction of the second armature core element is equal to a width of the first tooth in the thrust direction of the first armature core element, and
wherein the first tooth and the second tooth of each of the first armature core element and the second armature core element are rectangular parallelepiped.

2. The linear motor according to claim 1, wherein the number of the projecting portion formed on the first tooth or the number of the depressed portion formed on the second tooth is 2m (m: natural number).

3. The linear motor according to claim 1, wherein the first tooth and the second tooth extend obliquely relative to the transverse direction.

4. The linear motor according to claim 1, wherein no winding is wound around the first tooth and the second tooth, wherein the first tooth and the second tooth is in contact with windings wound around teeth adjacent to the first tooth and the second tooth, respectively, with an insulator interposed therebetween, and wherein teeth except for the first tooth and the second tooth are in contact with windings on both sides thereof with an insulator interposed therebetween.

5. The linear motor according to claim 1, wherein the armature core further comprises a third armature core element having the same shape in cross section as the first armature core element or the second armature core element in the thrust direction, wherein the first armature core element, the second armature core element, and the third armature core element are juxtaposed on the same side with respect to the plurality of magnets and in the transverse direction perpendicular to the thrust direction, and wherein a width in the transverse direction of the second armature core element is equal to the sum of widths in the transverse direction of the first armature core element and the third armature core element.

6. The linear motor according to claim 5, wherein the second armature core element is arranged between the first armature core element and the third armature core element in the transverse direction.

7. The linear motor according to claim 5, wherein a width of the first tooth in the thrust direction of the first armature core element or the third armature core element is equal to a width of the second tooth in the thrust direction of the second armature core element.

8. The linear motor according to claim 1, wherein the armature core further comprises a third armature core element and a fourth armature core element having the same shape in cross section as each other in the thrust direction, wherein the first armature core element, the second armature core element, the third armature core element, and the fourth armature core element are juxtaposed on the same side with respect to the plurality of magnets and in the transverse direction perpendicular to the thrust direction, and wherein a width of the first tooth in the thrust direction of the third armature core element is equal to a width of the first tooth in the thrust direction of the fourth armature core element.

* * * * *